US012594799B2

(12) United States Patent
Nuhn

(10) Patent No.:  US 12,594,799 B2
(45) Date of Patent:       Apr. 7, 2026

(54) AMPHIBIOUS VEHICLE WITH ADJUSTABLE COMPONENTS FOR USE IN A LIQUID MANURE LAGOON

(71) Applicant: Nuhn Industries Ltd., Sebringville (CA)

(72) Inventor: Ian Nuhn, Stratford (CA)

(73) Assignee: Nuhn Industries Ltd., Sebringville (CA)

( * ) Notice: Subject to any disclaimer, the term of this patent is extended or adjusted under 35 U.S.C. 154(b) by 426 days.

(21) Appl. No.: 18/136,943

(22) Filed: Apr. 20, 2023

(65) Prior Publication Data

US 2023/0347700 A1      Nov. 2, 2023

Related U.S. Application Data

(60) Provisional application No. 63/336,421, filed on Apr. 29, 2022.

(51) Int. Cl.
B60F 3/00             (2006.01)

(52) U.S. Cl.
CPC .......... B60F 3/0061 (2013.01); B60F 3/0007 (2013.01); B60F 3/0038 (2013.01)

(58) Field of Classification Search
CPC ........ B60F 3/00; B60F 3/0007; B60F 3/0038; B60F 3/0061
See application file for complete search history.

(56) References Cited

U.S. PATENT DOCUMENTS

| | | | | |
|---|---|---|---|---|
| 3,779,133 | A | * | 12/1973 | Dezelan ................. F15B 13/02 |
| | | | | 91/441 |
| 4,216,700 | A | * | 8/1980 | Iida ....................... E02F 9/2267 |
| | | | | 91/170 R |
| 8,944,758 | B2 | | 2/2015 | Nuhn |
| 9,694,636 | B2 | * | 7/2017 | Nuhn ...................... B60F 3/003 |
| 2012/0224982 | A1 | | 9/2012 | Nuhn |
| 2016/0222972 | A1 | | 8/2016 | Nuhn |
| 2017/0118907 | A1 | | 5/2017 | Nuhn |
| 2019/0174664 | A1 | | 6/2019 | Nuhn |
| 2019/0327885 | A1 | | 10/2019 | Nuhn |
| 2022/0290786 | A1 | | 9/2022 | Nuhn |
| 2023/0011309 | A1 | | 1/2023 | Nuhn |
| 2023/0064726 | A1 | | 3/2023 | Nuhn |
| 2023/0092599 | A1 | | 3/2023 | Nuhn |
| 2023/0114168 | A1 | | 4/2023 | Nuhn |

FOREIGN PATENT DOCUMENTS

WO      WO-2021074703 A1 *   4/2021   ............. H01F 7/081

* cited by examiner

*Primary Examiner* — Stephen P Avila
(74) *Attorney, Agent, or Firm* — Brunet & Co. Ltd.; Robert Brunet; Hans Koenig

(57)                    ABSTRACT
An amphibious vehicle for operation in a liquid manure lagoon has a first liquid manure mover (e.g., a propeller or a nozzle) that is vertically adjustable through a closed-loop linkage assembly to change the vertical position of the first liquid manure mover with respect to the surface of the liquid manure lagoon. The vehicle has a second liquid manure mover (e.g., a propeller or a nozzle) that is angularly adjustable to adjust the orientation of the second liquid manure mover with respect to the surface of the liquid manure lagoon.

16 Claims, 12 Drawing Sheets

AMPHIBIOUS VEHICLE WITH ADJUSTABLE COMPONENTS FOR USE IN A LIQUID MANURE LAGOON

CROSS-REFERENCE TO RELATED APPLICATIONS

This application claims the benefit of U.S. Provisional Application U.S. Ser. No. 63/336,421 filed Apr. 29, 2022, the entire contents of which is herein incorporated by reference.

FIELD

This application relates to agriculture, in particular to an amphibious vehicle for operation in a liquid manure lagoon.

BACKGROUND

Liquid manure comprises a suspension of solid manure in a liquid medium (i.e., water). Liquid manure is often stored in a large lagoon for use later for fertilizing fields. When use of the stored liquid manure is desired, a pump immersed in the liquid manure lagoon is used to pump the liquid manure out of the lagoon into a tank of a liquid manure spreader. However, liquid manure has a high concentration of solid material, which, over time, settles out and/or aggregates to collect as sediment on the bottom and/or top of the lagoon. To ensure that the solids are more or less homogeneously suspended in the liquid, especially just prior to and during pumping of the liquid manure out of the lagoon, an agitator device is used to agitate the liquid manure thereby keeping the solids mixed in the liquid. Due to the size of the lagoon, the agitator device is often mounted on a mobile amphibious vehicle that can travel throughout the lagoon mixing the liquid manure as the vehicle travels. The mobile amphibious vehicle may also be equipped with a liquid manure pump for pumping liquid manure out of the lagoon. An example of an amphibious vehicle is disclosed in U.S. Pat. No. 9,694,636 issued Jul. 4, 2017, the entire contents of which is herein incorporated by reference.

The mobile amphibious vehicle comprises a number of devices for agitating and/or pumping liquid manure in and/or from the lagoon. Such devices are collectively called liquid manure movers, and include propellers, conduits (with or without nozzles) connected to pumps and the like. The ability to orient the liquid manure movers on the vehicle is important to ensure that the liquid manure in the lagoon can be agitated thoroughly in all locations in a time efficient manner using as few liquid manure movers as possible, in as simple a manner as possible while being robust enough to operate in a dirty environment without undue malfunctioning. In some cases, the liquid manure movers may be used to provide propulsion for the amphibious vehicle instead of or in addition to agitating the liquid manure during operation of the amphibious vehicle in the lagoon.

To this end, there is still a need for adjustable components on amphibious vehicles for operation in a liquid manure lagoon, which can be oriented to provide one or more of the flexibilities described above.

SUMMARY

An amphibious vehicle for operation in a liquid manure lagoon comprises: a floatable vehicle body; a power source mounted on the vehicle body; a ground-engaging propulsion structure mounted on the vehicle body and operatively connected to the power source; a first liquid manure mover; a first adjustment assembly for vertically positioning the first liquid manure mover with respect to a surface of the lagoon, the first adjustment assembly comprising: a pivoting linkage assembly connecting the first liquid manure mover to the vehicle, the pivoting linkage assembly comprising a plurality of linkage arms pivotally connected in a closed-loop series, the first liquid manure mover mounted on a vertically oriented arm of the plurality of linkage arms; and, a linkage actuator pivotally connected at a proximal end thereof to the vehicle body and pivotally connected at a distal end thereof to a horizontally oriented arm of the plurality of linkage arms, actuation of the linkage actuator causing the horizontally oriented arm to pivot in the pivoting linkage assembly thereby causing the vertically oriented arm to translate vertically with the first liquid manure mover mounted thereon; a second liquid manure mover; and, a second adjustment assembly for angularly orienting the second liquid manure mover with respect to the surface of the lagoon, the second adjustment assembly comprising: a mounting plate having an eccentrically positioned lobe, the second liquid manure mover mounted on the mounting plate; and, a mounting plate actuator pivotally connected to the vehicle body and pivotally connected to the eccentrically positioned lobe at a point spatially offset from an axis of rotation of the mounting plate, actuation of the mounting plate actuator causing the mounting plate to rotate thereby causing the second liquid manure mover to rotate to angularly adjust the orientation of the second liquid manure mover.

An adjustable component for use on an amphibious vehicle in a liquid manure lagoon comprises: a liquid manure mover; and, an adjustment assembly mountable on the vehicle for vertically positioning the liquid manure mover with respect to a surface of the lagoon, the adjustment assembly comprising: a pivoting linkage assembly configured to be connected to the vehicle for connecting the liquid manure mover to the vehicle, the pivoting linkage assembly comprising a plurality of linkage arms pivotally connected in a closed-loop series when mounted on the vehicle, the first liquid manure mover mounted on a vertically oriented arm of the plurality of linkage arms; and, a linkage actuator pivotally connectable at a proximal end thereof to the vehicle body and pivotally connected at a distal end thereof to a horizontally oriented arm of the plurality of linkage arms, actuation of the linkage actuator causing the horizontally oriented arm to pivot in the pivoting linkage assembly thereby causing the vertically oriented arm to translate vertically with the first liquid manure mover mounted thereon.

An adjustable component for use on an amphibious vehicle in a liquid manure lagoon comprises: a liquid manure mover; and, an adjustment assembly mountable on the vehicle for angularly orienting the liquid manure mover with respect to a surface of the lagoon, the adjustment assembly comprising: a mounting plate having an eccentrically positioned lobe, the liquid manure mover mounted on the mounting plate, the mounting plate configured to be rotatably mounted on the vehicle; and, a mounting plate actuator pivotally connectable to the vehicle body and pivotally connected to the eccentrically positioned lobe at a point spatially offset from an axis of rotation of the mounting plate, actuation of the mounting plate actuator causing the mounting plate to rotate thereby causing the liquid manure mover to rotate to angularly adjust the orientation of the liquid manure mover.

In another embodiment, an amphibious vehicle for operation in a liquid manure lagoon comprises: a floatable vehicle body; a power source mounted on the vehicle body; a ground-engaging propulsion structure mounted on the vehicle body and operatively connected to the power source; and, a plurality of vertically and/or angularly liquid manure movers for propelling the vehicle and agitating liquid manure in the lagoon.

In another embodiment, an amphibious vehicle for operation in a liquid manure lagoon comprises: a floatable vehicle body; a power source mounted on the vehicle body; a ground-engaging propulsion structure mounted on the vehicle body and operatively connected to the power source; an angularly adjustable liquid manure mover for providing propulsion and steering for the vehicle; and, a double-barreled actuator connecting the liquid manure mover to the vehicle whereby actuation of the double-barreled actuator angularly adjusts the liquid manure mover to move and steer the vehicle.

The liquid manure movers include, for example, propellers, impellers, augers, fluid conduits through which liquid manure is pumped, and the like, or any combination thereof. Fluid conduits may comprise a nozzle or other features for affecting the flow of fluid therethrough. The liquid manure movers may be utilized for propelling the vehicle, steering the vehicle, agitating the liquid manure in the lagoon to resuspend solids or any combination of the above. In some embodiments, the liquid manure movers may include an impeller housed in a fluid conduit, for example the impeller of a fluid pump.

Any one or all of the functions of the vehicle may be controlled remotely, either automatically by a programmed controller or by a human operator. Thus, the vehicle may comprise a remote control configured to cause the vehicle to be remotely controllable by the operator or the programmed controller remote from the vehicle. The vehicle may be remotely controllable from the vehicle when the vehicle is ground-engaging and when the vehicle is floating. The remote control may comprise a wireless transmitter and a wireless receiver. The remote control may be configured to control the speed and or direction of the vehicle when ground-engaging and when floating. The remote control may be configured to control an amount of fluid flow caused by one or more of the liquid manure movers, preferably all of the liquid manure movers. The remote control may be configured to control an angular orientation of at least one of the liquid manure movers relative to the vehicle body, preferably all of the liquid manure movers. For liquid manure movers that comprise pressurized conduits, the remote control structure may be configured to control one or more valve assemblies in order to proportion fluid flow between the liquid manure movers and in order to control the amount of liquid manure flowing through one or more conduits. The remote control may be configured to control rotational speed of one or more fluid pumps. The remote control structure may be configured to raise and lower one or more of the fluid pumps. The remote control may be configured to raise and lower ground-engaging propulsion structures. The remote control structure may be configured to start and stop the power source.

In some embodiments, the controller is operatively connected to one or more double-barreled actuators that control the angular orientation of one or more of the liquid manure movers. The controller is preferably configured to automatically return the one or more liquid manure movers to a state in which the vehicle is not propelled and steered when an operator is not actively operating the vehicle.

The liquid manure movers on the vehicle as described herein ensure that the liquid manure in the lagoon can be agitated thoroughly in all locations in a time efficient manner using few liquid manure movers, in as simple a manner while being robust enough to operate in a dirty environment without undue malfunctioning.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
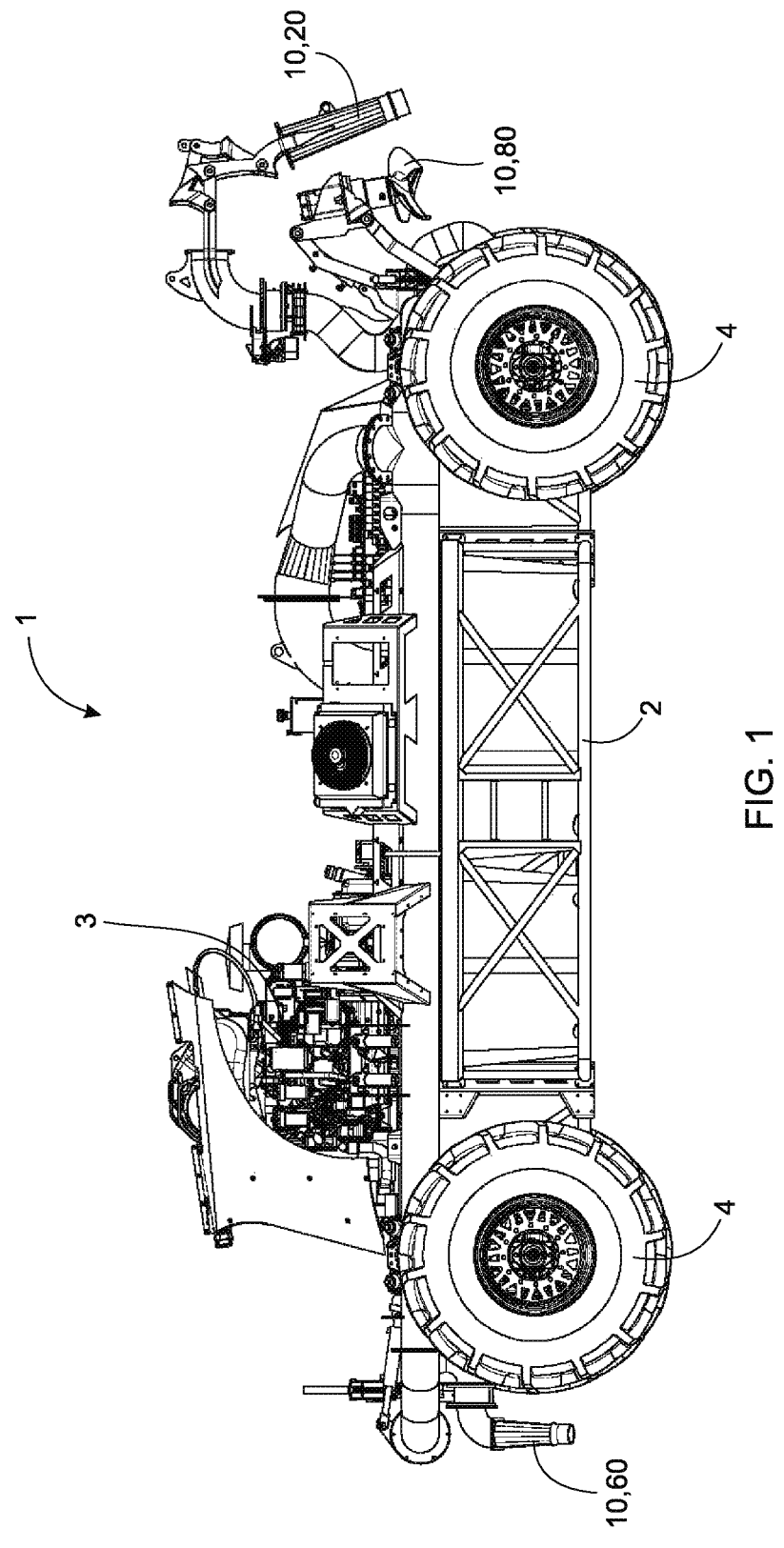
FIG. 1 depicts a side view of an amphibious vehicle for operation in a liquid manure lagoon.

FIG. 1 to FIG. 12B depict an embodiment of an amphibious vehicle 1 for operation in a liquid manure lagoon, the amphibious vehicle 1 comprising various adjustable liquid manure movers 10 configured to be positionable and/or orientable to ensure that the liquid manure in the lagoon can be agitated thoroughly in all locations in a time efficient and simple manner while being robust enough to operate in the lagoon without undue malfunctioning.

The vehicle 1 comprises a floatable body 2 having sufficient buoyancy so that the vehicle 1 can float in the liquid manure lagoon. The vehicle 1 comprises a power source 3 (e.g., an engine, for example a diesel or gasoline engine) mounted on the body 2, the power source 3 configured to provide power to powered components of the vehicle 1. For propulsion on dry land, the vehicle 1 comprises rotatable ground-engaging propulsion structures (e.g., tired wheels 4, or some other ground-engaging propulsion structure such as endless tracks) operatively connected to the power source 3.

For propulsion while floating in the liquid manure lagoon, the vehicle 1 comprises one or more liquid manure movers 10 (e.g., propellers, fluid conduits through which liquid manure is pumped, and the like). In the illustrated embodiment, the vehicle 1 comprises a rear propulsion nozzle 60 and a front steering nozzle 40 through which liquid manure is pumped to provide jets of liquid for propelling and steering the vehicle 1 on a surface of the liquid manure lagoon. One or both of the propulsion nozzle and steering nozzle may instead be a propeller. The one or more liquid manure movers used for propulsion and steering may also contribute to agitation of the liquid manure during operation of the vehicle 1. In the illustrated embodiment, in addition to the rear propulsion nozzle 60 and the front steering nozzle 40, the one or more liquid manure movers 10 comprise an agitation nozzle 20 and an agitation propeller 80. The agitation nozzle 20 and agitation propeller 80 are situated at a front of the vehicle 1, and serve to break up and re-suspend solid manure in the lagoon. A nozzle may be simply an outlet of a fluid conduit in fluid communication with a liquid manure pump, or the nozzle may comprise further structure (e.g., tapered tubes, constrictions and the like) for directing and/or affecting the speed of the fluid exiting the outlet of the conduit. Operation of the one or more liquid manure movers 10 is accomplished with appropriate motivators, for example motors (e.g., hydraulic motors or electric motors), which are operatively connected to the power source 3 to be powered by the power source 3. Where the liquid manure movers 10 comprise pressurized fluid conduits, the motivator or motivators may be operatively connected to one or more fluid pumps, for example one or more liquid manure pumps 5, that pump liquid manure from the lagoon and through fluid conduits 6 to be ejected through the outlets of the pressurized fluid conduits.

Each of the liquid manure movers 10 is angularly and/or linearly adjustable to change the direction in and/or location at which the liquid manure movers 10 move liquid manure in the lagoon. Adjustability of the liquid manure movers 10 may be accomplished through actuators (e.g., hydraulic, pneumatic or electric actuators, preferably hydraulic cylinders) as described below.

With particular reference to FIG. 1, FIG. 2A, FIG. 2B and FIG. 2C, the agitation propeller 80 is mounted on the vehicle 1 so that the propeller 80 is oriented vertically, with a propeller rotation axis substantially perpendicular to a surface of the lagoon. Further, the propeller 80 is vertically adjustable in order to situate the propeller 80 at an optimal depth in the lagoon for a desired liquid manure flow pattern from the surface down into the lagoon. Depending on the consistency of the solids in the lagoon at any one place at any one time, a different flow pattern is required to efficiently breakup and re-suspend the solids. Orienting the propeller 80 vertically and providing the ability to vertically adjust a position of the propeller 80 provides more options for greater agitation efficiency.

Figures 2A, 2B, 2C:
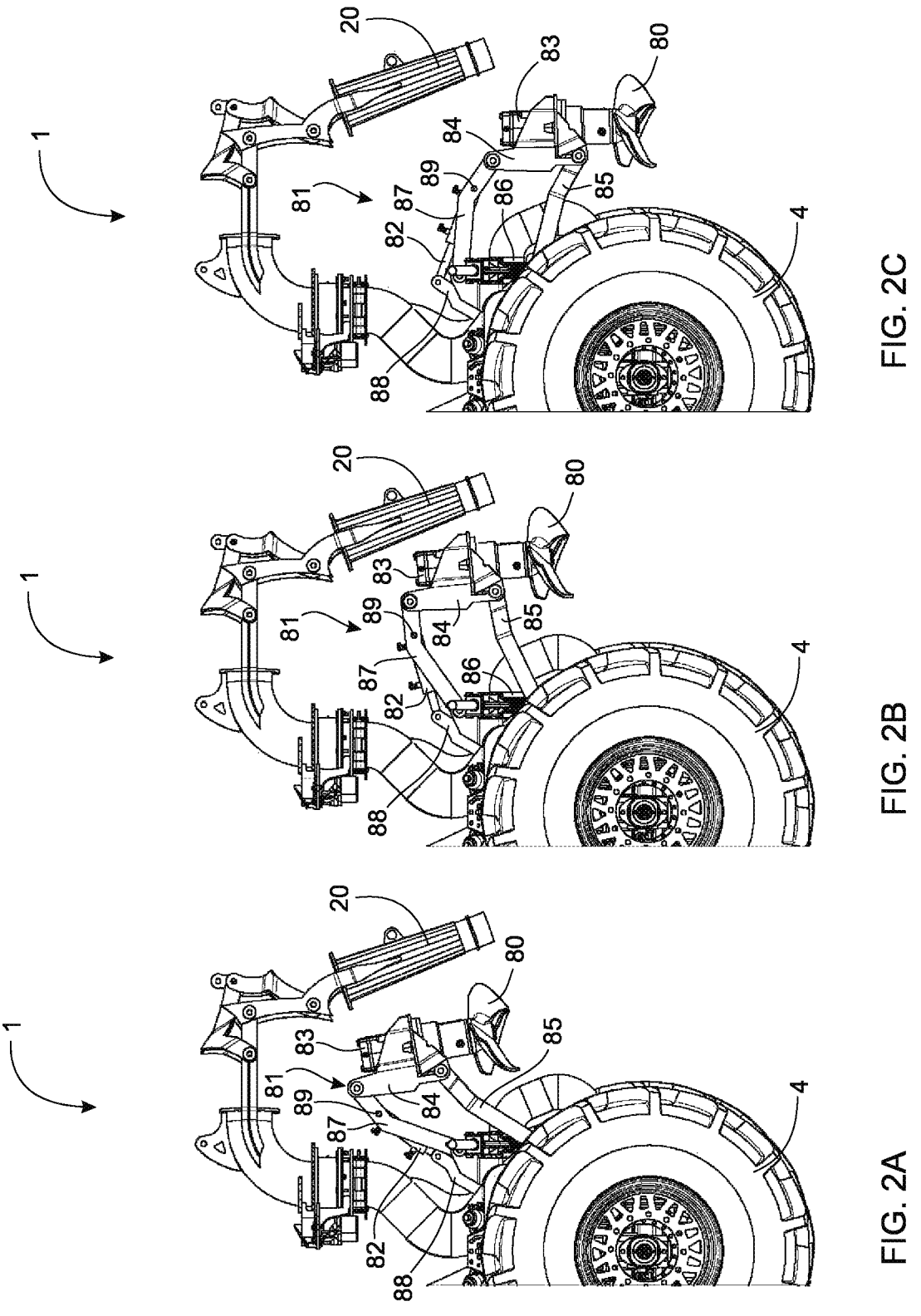
FIG. 2A depicts a magnified side view of a front end of the amphibious vehicle of FIG. 1 with a vertically oriented agitator propeller in vertically up position.
FIG. 2B depicts the magnified side view of FIG. 2A with the vertically oriented agitator propeller in a vertically intermediate position.
FIG. 2C depicts the magnified side view of FIG. 2A with the vertically oriented agitator propeller in a vertically down position.
Figure 3:
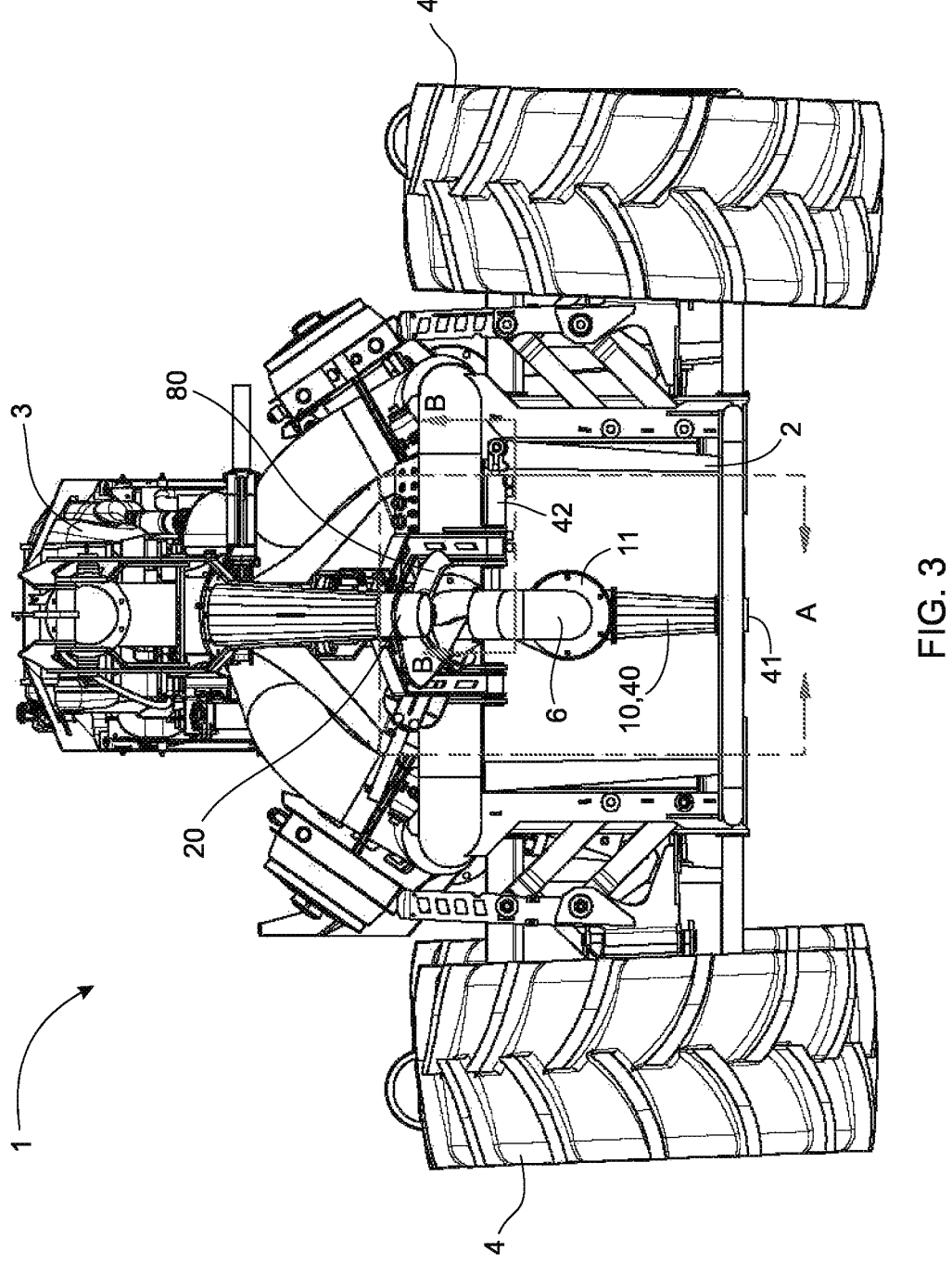
FIG. 3 depicts a front end view of the amphibious vehicle of FIG. 1.

The agitation propeller 80 is mounted on the vehicle 1 by a pivoting 4-bar linkage assembly 81 comprising a vertically oriented first arm 84, a horizontally oriented second arm 85, a vertically oriented third arm 86 and a horizontally oriented fourth arm 87 pivotally connected in a closed-loop series. The first arm 84 is pivotally connected to the second arm 85, which in turn is pivotally connected to the third arm 86, which in turn is pivotally connected to the fourth arm 87, which in turn is pivotally connected to the first arm 84. Pivot axes at pivot points between the arms are oriented substantially parallel to the surface of the lagoon (i.e., substantially perpendicular to the propeller rotation axis). The 4-bar linkage assembly 81 is fixedly mounted to the vehicle through the third arm 86. The propeller 80 is rotatably mounted on a propeller motor 83, the propeller motor 83 being fixedly mounted to the first arm 84, which is opposite the third arm 86. The 4-bar linkage assembly 81 is mounted on the vehicle 1 such that the first and third arms 84 and 86, respectively, are substantially vertically oriented. The 4-bar linkage assembly 81 is operatively connected to a linkage actuator 82 (e.g., an electric or hydraulic actuator, preferably a hydraulic actuator) whereby a proximal end of the linkage actuator 82 is pivotally connected to the body 2 of the vehicle 1 through a connecting bar 88 and a distal end of the linkage actuator 82 is pivotally connected to the fourth arm 87 at a position on the fourth arm 87 closer to the first arm 84 than the third arm 86. To assist with smooth operation of the linkage assembly 81, the fourth arm 87 has a bend and the linkage actuator 82 is pivotally connected to the fourth arm 87 at a pivot point 89 between the bend and the first arm 84. Actuation of the linkage actuator 82 causes a distal end of the fourth arm 87 to raise or lower depending on whether the linkage actuator 82 extends or retracts, thereby causing the first arm 84 to raise or lower thereby adjusting a vertical position of the propeller motor 83 and the propeller 80 thereon anywhere between an uppermost position (FIG. 2A) and a lowermost position (FIG. 2C). Adjusting the vertical position of the propeller 80 does not substantially change an angle of the propeller rotation axis, which remains substantially perpendicular to a surface of the lagoon, the angle of the propeller rotation axis changing only within a tolerance of about ±5°.

Figure 4C:
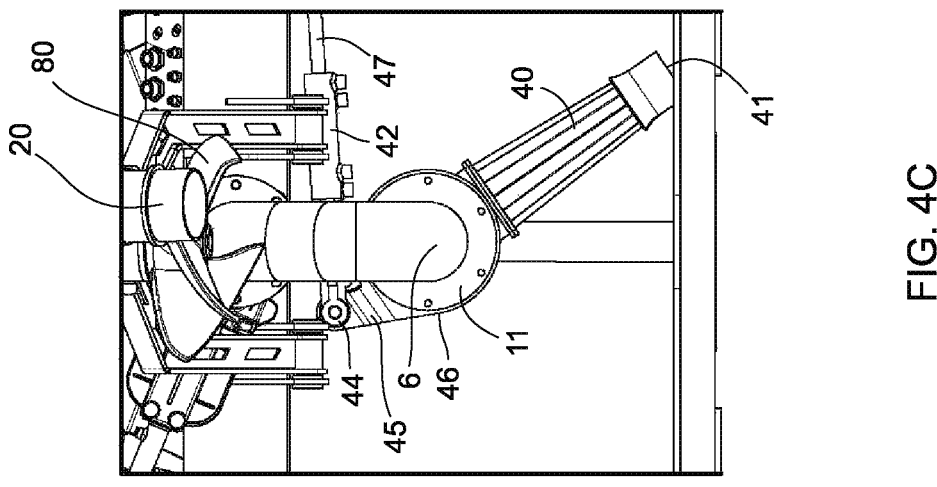
FIG. 4C depicts the magnified view of FIG. 4A with the front steering nozzle angled toward a lower left side of the amphibious vehicle.
Figure 4B:
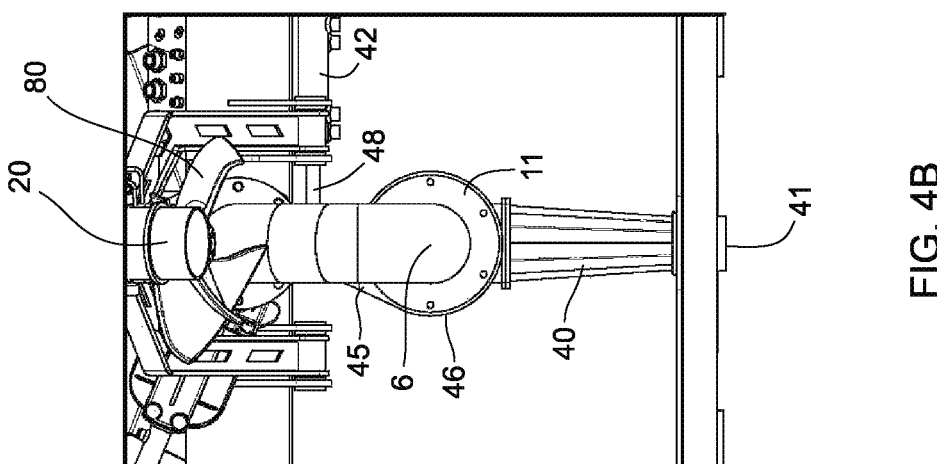
FIG. 4B depicts the magnified view of FIG. 4A with the front steering nozzle angled directly vertically downward.
Figure 4A:
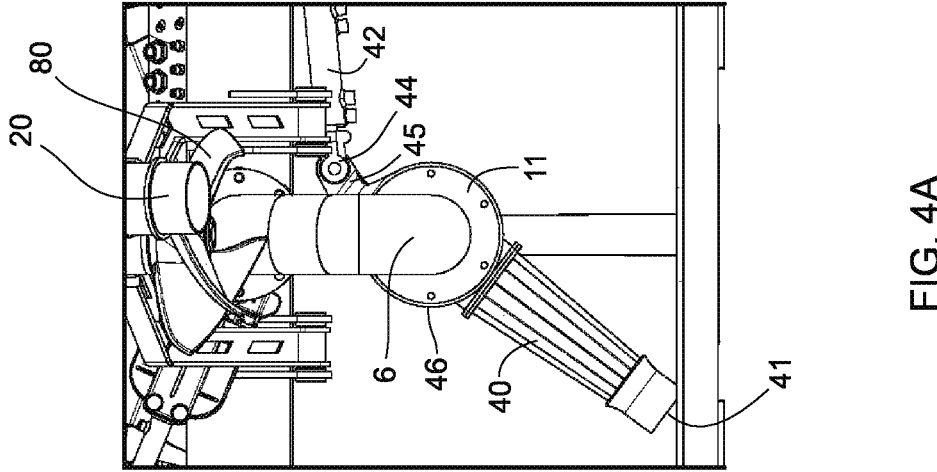
FIG. 4A depicts a magnified view of detail A from FIG. 3 with a front steering nozzle angled toward a lower right side of the amphibious vehicle.

With particular reference to FIG. 3, FIG. 4A, FIG. 4B, FIG. 4C, FIG. 5A, FIG. 5B and FIG. 5C, the front steering nozzle 40 is rotatably mounted on a mounting flange 11 at an outlet end of one of the fluid conduits 6 through which liquid manure is pumped. The front steering nozzle 40 has an axis of rotation that is substantially parallel to the surface of the lagoon and substantially parallel to the longitudinal axis of the vehicle 1, while an outlet 41 of the front steering nozzle 40 is vertically oriented so that liquid manure pumped through the front steering nozzle 40 is directed toward the surface of the lagoon. As seen in 4A, FIG. 4B and FIG. 4C, the front steering nozzle 40 is orientable between a rightmost position (FIG. 4A) and a leftmost position (FIG. 4C), where FIG. 4A to FIG. 4C are views from the front of the vehicle 1. In the rightmost position (FIG. 4A), the front steering nozzle 40 directs liquid manure toward a lower right side of the amphibious vehicle 1. In the leftmost position (FIG. 4C), the front steering nozzle 40 directs liquid manure toward a lower left side of the amphibious vehicle 1. The front steering nozzle 40 is orientable at any angle between the rightmost position and the leftmost position, including a completely vertical position (FIG. 4B) at which the front steering nozzle 40 directs liquid manure directly downward. Adjusting the angular position of the front steering nozzle 40 provides steering and propulsion for the vehicle 1 in the lagoon, in addition to helping agitate the solids in the lagoon.

Figure 5C:
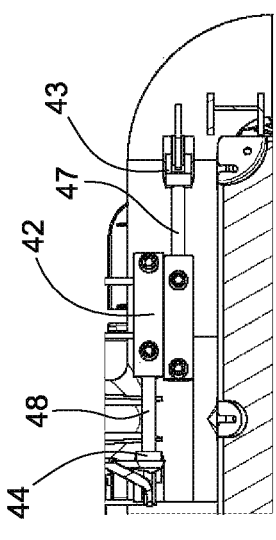
FIG. 5C depicts the cross-sectional view of FIG. 5A but corresponding to the view depicted in FIG. 4C.
Figure 5B:
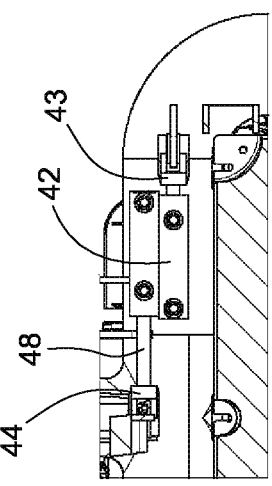
FIG. 5B depicts the cross-sectional view of FIG. 5A but corresponding to the view depicted in FIG. 4B.
Figure 5A:
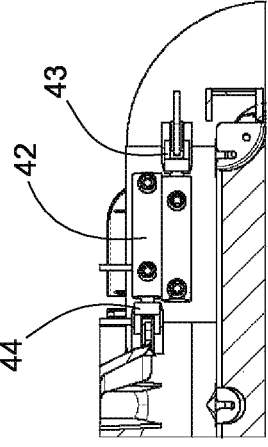
FIG. 5A depicts a cross-sectional view through B-B from FIG. 3 and corresponds to the configuration of the front steering nozzle in the view depicted in FIG. 4A.
Figure 6:
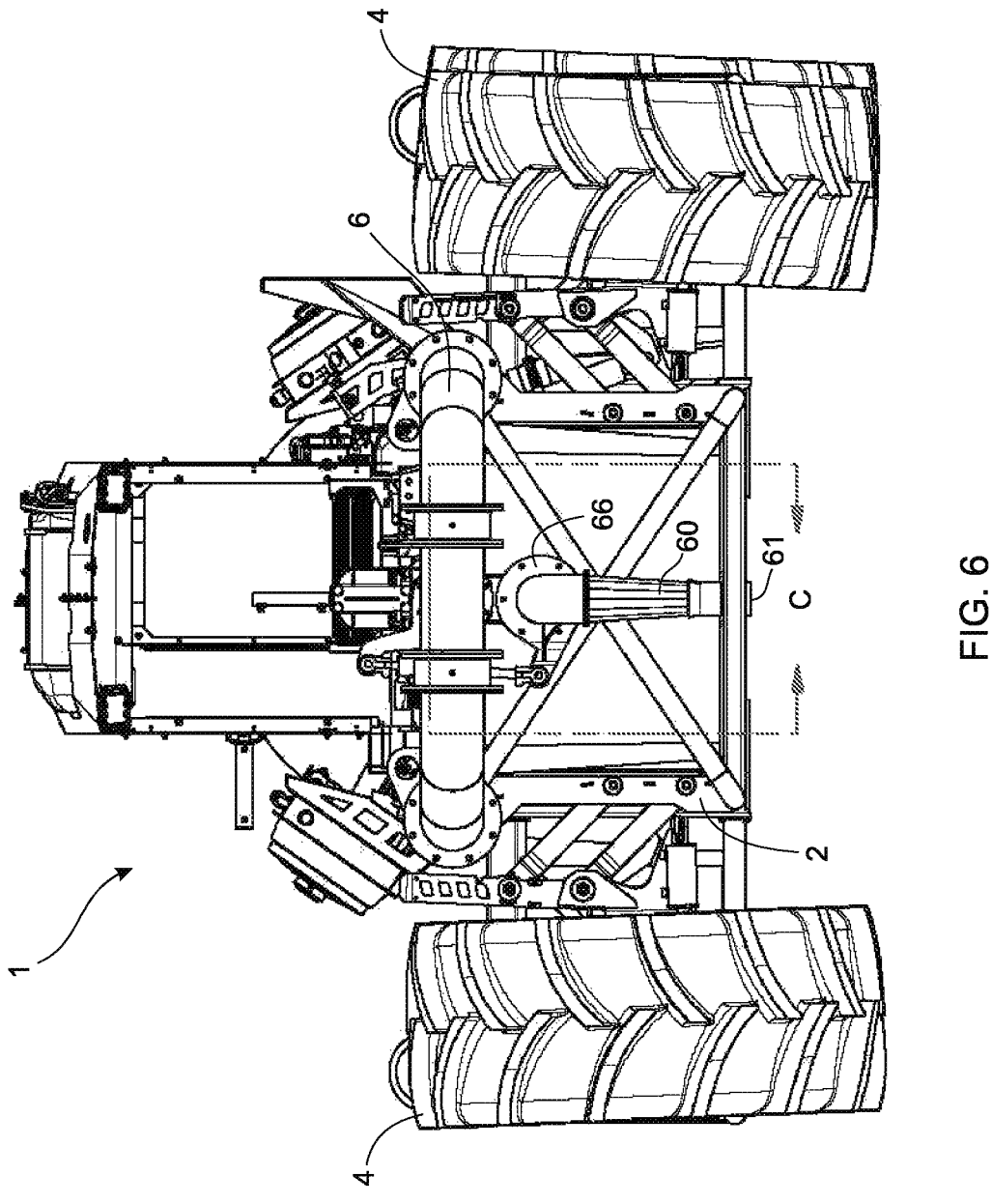
FIG. 6 depicts a rear end view of the amphibious vehicle of FIG. 1.
Figure 7:
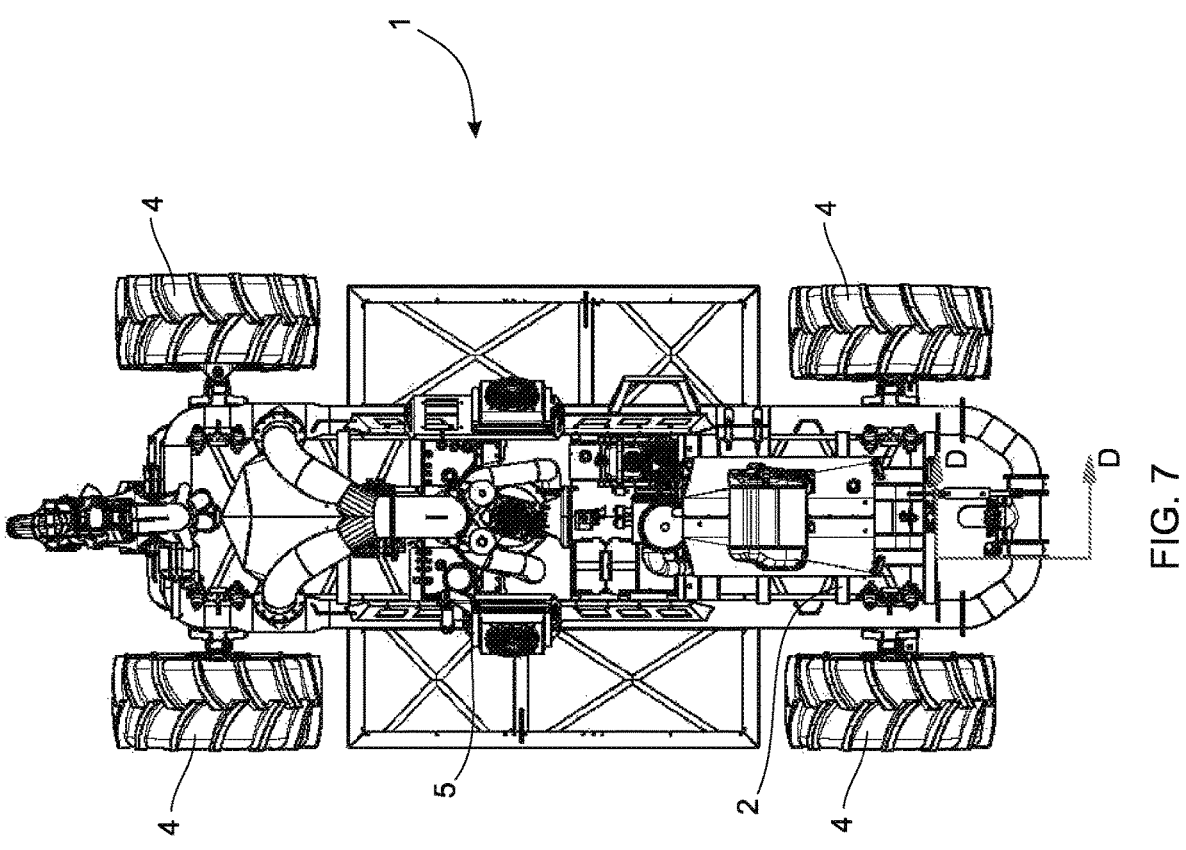
FIG. 7 depicts a top view of the amphibious vehicle of FIG. 1.

Angular adjustability of the front steering nozzle 40 is accomplished with a double-barreled mounting plate actuator 42 (e.g., an electric or hydraulic actuator, preferably a hydraulic actuator) having a first rod 47 and a second rod 48, which extend in opposite directions and whose extension axes are non-parallel with, for example perpendicular to, the longitudinal axis of the vehicle 1. The first rod 47 has an end 43 pivotally connected to the body 2 of the vehicle 1 and the second rod 48 has an end 44 pivotally connected to an eccentrically positioned lobe 45 of a lobed mounting plate 46 of the front steering nozzle 40, the lobed mounting plate 46 rotatably mounted on the mounting flange 11. The end 44 of the second rod 48 is pivotally connected to the eccentrically positioned lobe 45 at a point spatially offset from the axis of rotation of the front steering nozzle 40. With the first rod 47 and the and second rod 48 retracted, the front steering nozzle 40 is in the rightmost position (FIG. 4A, FIG. 5A). With the first rod 47 extended and the second rod 48 retracted, the front steering nozzle 40 is oriented vertically directly downward (FIG. 4B, FIG. 5B). With the first rod 47 and the and second rod 48 extended, the front steering nozzle 40 is in the leftmost position (FIG. 4C, FIG. 5C). Operating the double-barreled actuator 42 can thereby make angularly adjust the left-right orientation of the front steering nozzle 40 through an angle of up to about 90° to permit steering the vehicle 1 while operating in the lagoon. Preferably, the angle is in a range of about 60-90°, for example about 80°.

With particular reference to FIG. 6 to FIG. 12B, the rear propulsion nozzle 60 is adjustably mounted on the vehicle 1 so that the rear propulsion nozzle 60 can be angularly adjusted in both a horizontal and a vertical plane with respect to the surface of the lagoon.

As seen in FIG. 8A to FIG. 9C, the rear propulsion nozzle 60 is angularly adjustable so that an outlet 61 of the rear propulsion nozzle 60 can be pointed toward a lower left side of the vehicle 1 (FIG. 8A and FIG. 9A), a lower right side of the vehicle 1 (FIG. 8C and FIG. 9C) or at any angle therebetween such as directly downward (FIG. 8B, FIG. 9B) in a vertical plane with respect to the surface of the lagoon, the vertical plane being perpendicular to the longitudinal axis of the vehicle 1. Operating the rear propulsion nozzle 60 as shown in FIG. 8A to FIG. 9C permits steering of the vehicle 1 in addition to contributing to agitation of the solids in the lagoon. The rear propulsion nozzle 60 can be angularly adjusted in the left-right orientation through an angle of up to about 90° to permit steering the vehicle 1 while operating in the lagoon. The steering operation of the rear propulsion nozzle 60 is similar to operation of the front steering nozzle 40.

Figure 8C:
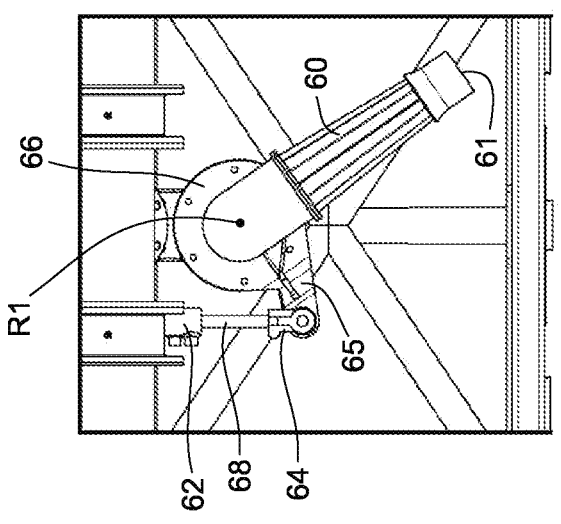
FIG. 8C depicts the magnified view of FIG. 8A with the rear propulsion nozzle angled toward a lower right side of the amphibious vehicle.
Figure 8B:
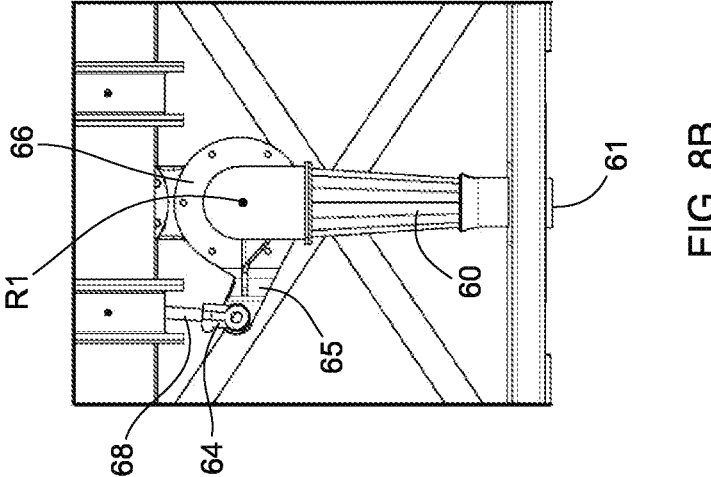
FIG. 8B depicts the magnified view of FIG. 8A with the rear propulsion nozzle angled directly vertically downward.
Figure 8A:
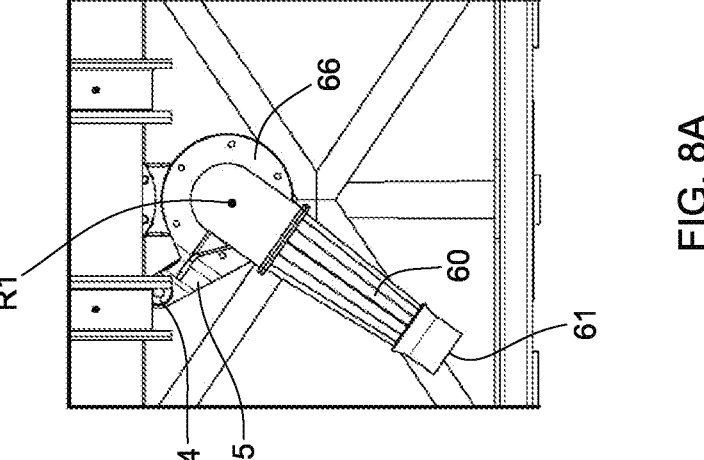
FIG. 8A depicts a magnified view of detail C from FIG. 6 with a rear propulsion nozzle angled toward a lower left side of the amphibious vehicle.
Figures 9A, 9B, 9C:
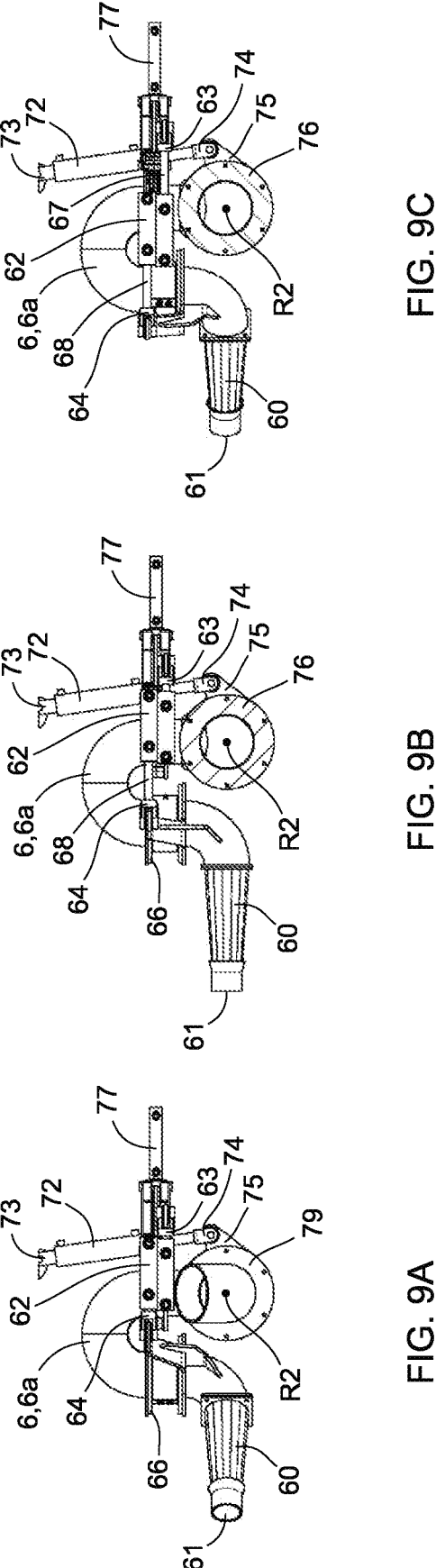
FIG. 9A depicts a cross-sectional view through D-D from FIG. 7 and corresponds to the configuration of the rear propulsion nozzle in the view depicted in FIG. 8A.
FIG. 9B depicts the cross-sectional view of FIG. 9A but corresponding to the configuration of the rear propulsion nozzle in the view depicted in FIG. 9B.
FIG. 9C depicts the cross-sectional view of FIG. 9A but corresponding to the configuration of the rear propulsion nozzle in the view depicted in FIG. 9C.
Figure 10:
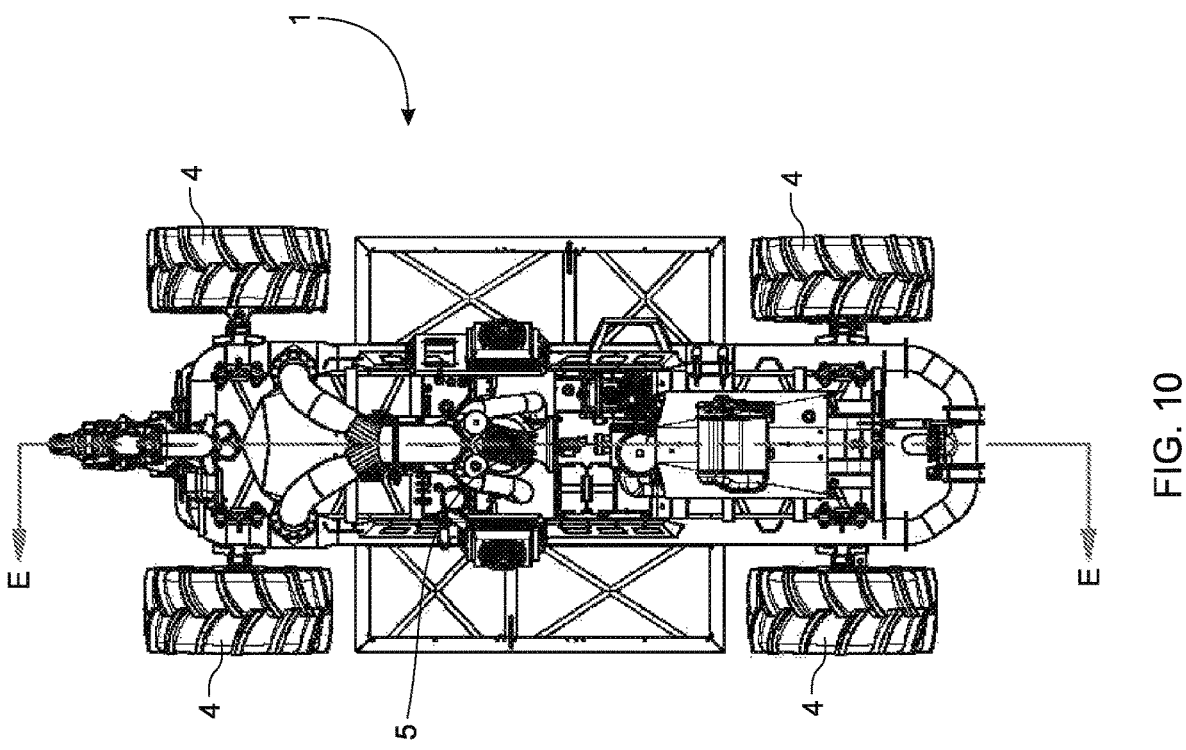
FIG. 10 depicts a top view of the amphibious vehicle of FIG. 1.

Left-right angular adjustability of the rear propulsion nozzle 60 is accomplished with a double-barreled mounting plate actuator 62 (e.g., an electric or hydraulic actuator, preferably a hydraulic actuator) having a first rod 67 and a second rod 68, which extend in opposite directions and whose extension axes are non-parallel with, for example perpendicular to, the longitudinal axis of the vehicle 1. The first rod 67 has an end 63 pivotally connected to the body 2 of the vehicle 1 and the second rod 68 has an end 64 pivotally connected to an eccentrically positioned lobe 65 of a lobed mounting plate 66 of the rear propulsion nozzle 60, the lobed mounting plate 66 rotatably mounted on a distal mounting flange of a multiply bent conduit 6a of the conduits 6 of the vehicle 1. The end 64 of the second rod 68 is pivotally connected to the eccentrically positioned lobe 65 at a point spatially offset from a rotation axis R1 of the rear propulsion nozzle 60. With the first rod 67 and the and second rod 68 retracted, the rear propulsion nozzle 60 is in the leftmost position (FIG. 8A, FIG. 9A). With the first rod 67 extended and the second rod 68 retracted, the rear propulsion nozzle 60 is oriented vertically directly downward (FIG. 8B, FIG. 9B). With the first rod 67 and the and second rod 68 extended, the rear propulsion nozzle 60 is in the rightmost position (FIG. 8C, FIG. 9C).

Figure 11:
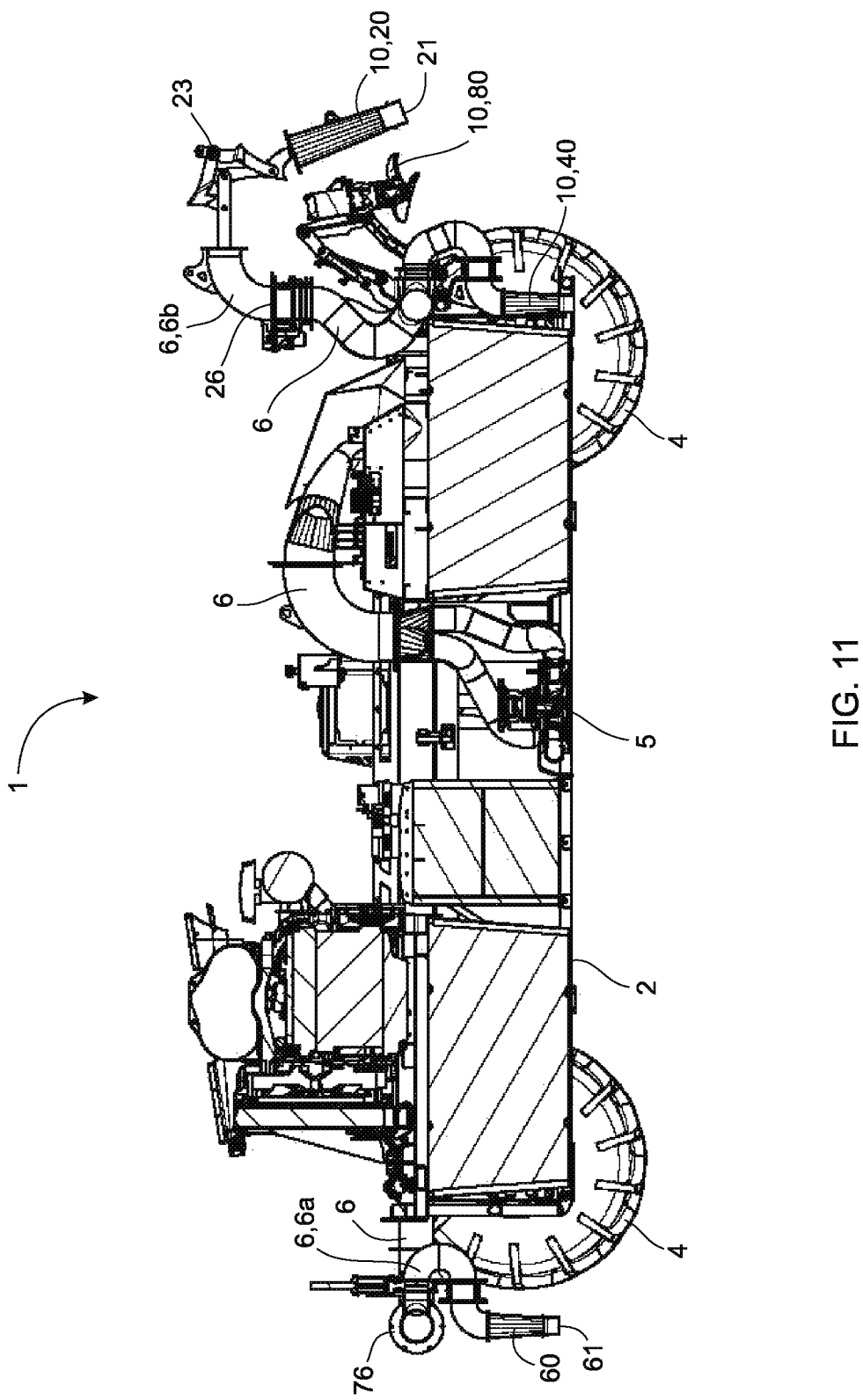
FIG. 11 depicts a cross-sectional view through E-E from FIG. 10 showing the rear propulsion nozzle angled directly vertically downward.
Figure 12B:
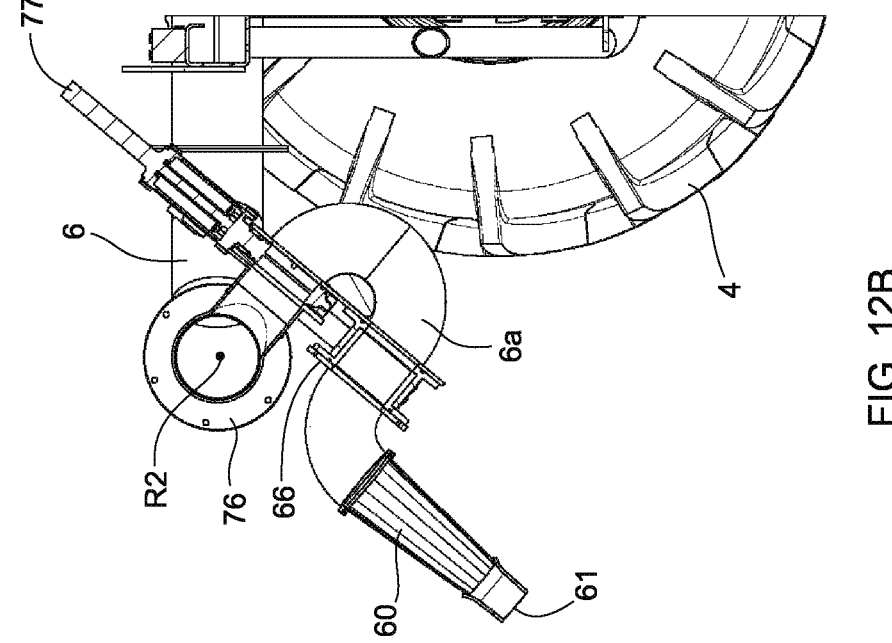
FIG. 12B depicts a magnified view of a rear end of the amphibious vehicle shown in FIG. 11 with the rear propulsion nozzle angled more upwardly and rearwardly.
Figure 12A:
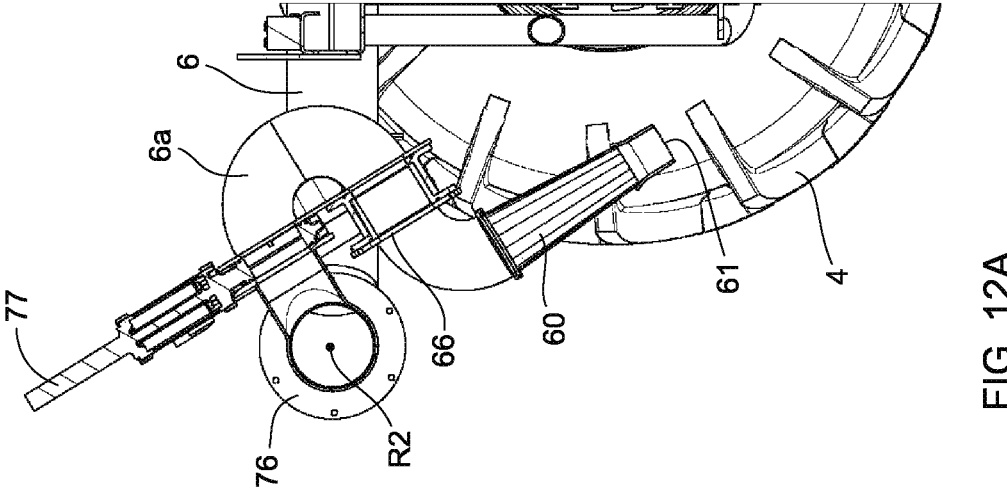
FIG. 12A depicts a magnified view of a rear end of the amphibious vehicle shown in FIG. 11 with the rear propulsion nozzle angled more upwardly and forwardly.

As seen in FIG. 9A to FIG. 9C, FIG. 11 and FIG. 12A to FIG. 12B, the rear propulsion nozzle 60 is also angularly adjustable so that an outlet 61 of the rear propulsion nozzle 60 can be pointed forward (FIG. 12A), rearward (FIG. 12B) or at any angle therebetween such as directly downward (FIG. 11) in a vertical plane with respect to the surface of the lagoon, the vertical plane being parallel to the longitudinal axis of the vehicle 1. Operating the rear propulsion nozzle 60 as shown in FIG. 12A to FIG. 12B permits propelling the vehicle 1 forward (FIG. 12B) and backward (FIG. 12A) in addition to contributing to agitation of the solids in the lagoon. The rear propulsion nozzle 60 can be angularly adjusted in the forward-rearward orientation through an angle of up to about 90° to permit propelling the vehicle 1 at different velocities while operating in the lagoon. Preferably, the angle is in a range of about 60-90°, for example about 80°. Further control over velocity of the vehicle 1 is accomplished with a valve assembly 77 including a valve gate situated in the fluid flow path between the rear propulsion nozzle 60 and the multiply bent conduit 6a to regulate flow of liquid manure through the rear propulsion nozzle 60.

Forward-rearward angular adjustability of the rear propulsion nozzle 60 is accomplished with a mounting plate actuator 72 (e.g., an electric or hydraulic actuator, preferably a hydraulic actuator) having a first end 73 pivotally connected to the body 2 and a second end 74 pivotally connected to a to an eccentrically positioned lobe 75 of a lobed mounting plate 76 of the multiply bent conduit 6a. The second end 74 of the actuator 72 is pivotally connected to the eccentrically positioned lobe 75 at a point spatially offset from a rotation axis R2 of the multiply bent conduit 6a. Actuation of the actuator 72 causes the multiply bent conduit 6a to rotate about the rotation axis R2 thereby causing the rear propulsion nozzle 60 to move vertically. With a rod of the actuator 72 retracted, the rear propulsion nozzle 60 points forward (FIG. 12A). With the rod of the actuator 72 extended, the rear propulsion nozzle 60 points rearward (FIG. 12B). Thus, at one extreme of the vertical movement of the rear propulsion nozzle 60, the rear propulsion nozzle 60 points forward (FIG. 12A) and at the other extreme of the vertical movement of the rear propulsion nozzle 60, the rear propulsion nozzle 60 points rearward (FIG. 12B). In between the extremes of vertical movement of the rear propulsion nozzle 60, the rear propulsion nozzle 60 points directly downward (FIG. 11).

The lobed mounting plate 66 of the rear propulsion nozzle 60 is rotatably mounted to the multiply bent conduit 6a at a distal end of the multiply bent conduit 6a. The lobed mounting plate 76 of the multiply bent conduit 6a is at a proximal end of the multiply bent conduit 6a and is rotatably mounted on a mounting flange at a distal end of one of the conduits 6 of the vehicle 1. Thus, the multiply bent conduit 6a is between the distal end of one of the conduits 6 and the rear propulsion nozzle 60. The rear propulsion nozzle 60 rotates at the distal end of the multiply bent conduit 6a about a horizontally oriented rotation axis R1 that is parallel to the longitudinal axis of the vehicle 1. The multiply bent conduit 6a rotates at the proximal end of the multiply bent conduit 6a about a horizontally oriented rotation axis R2 that is perpendicular to the longitudinal axis of the vehicle 1. In this manner, the rear propulsion nozzle 60 is adjustable both horizontally and vertically to orient the outlet 61 of the rear propulsion nozzle 60 in a desired direction left and right as well as forward and rearward.

The front steering nozzle 40 and the rear propulsion nozzle 60 may be used in tandem to provide propulsion and steering for the vehicle 1. Actuation of the two nozzles 40 and 60 is electronically tied to a remote controller, for example a controller comprising a joystick, that controls the angular orientations of the two nozzles 40 and 60 simultaneously in order to obtain the desired motion of the vehicle 1. In an especially useful embodiment, the controller is configured so that release of the control structure (e.g., the joystick) automatically returns the controller to a neutral state thereby automatically returning a movement mode of the vehicle 1 to a complete neutral mode in which the vehicle 1 is not moving. Such a 'self-centering' feature is an important safety feature during operation of the vehicle 1 ensuring that the vehicle 1 is moving only when an operator is paying attention. The use of double-barreled actuators 42 and 62 to angularly adjust the front steering nozzle 40 and rear propulsion nozzle 60, respectively, are particularly useful for enabling the self-centering feature. The operations of the double-barreled actuators 42 and 62, as well as the mounting plate actuator 72, are explained below in connection with various movement modes of the vehicle 1.

In some embodiments, there may be several movement modes as shown in Table 1 including: (a) complete neutral (CN); (b) vehicle forward steered straight (VFSS); (c) vehicle forward steered left (VFSL); (d) vehicle forward steered right (VFSR); (e) vehicle reverse steered straight (VRSS); (f) vehicle reverse steered left (VRSL); (g) vehicle reverse steered right (VRSR); (h) side shift left (SSL); and, (i) side shift right (SSR).

TABLE 1

| Movement mode | Front steering nozzle 40 | | Rear propulsion nozzle 60 | | |
| | First rod 47 | Second rod 48 | First rod 67 | Second rod 68 | Actuator 72 |
| --- | --- | --- | --- | --- | --- |
| CN | retracted | extended | retracted | extended | half-way |
| VFSS | retracted | extended | retracted | extended | extended |
| VFSL | retracted | retracted | retracted | retracted | extended |
| VFSR | extended | extended | extended | extended | extended |
| VRSS | retracted | extended | retracted | extended | retracted |
| VRSL | extended | extended | extended | extended | retracted |
| VRSR | retracted | retracted | retracted | retracted | retracted |
| SSL | retracted | retracted | extended | extended | half-way |
| SSR | extended | extended | retracted | retracted | half-way |

In complete neutral (CN), the front steering nozzle 40 and the rear propulsion nozzle 60 both point vertically straight down toward the surface of the lagoon, as shown in FIG. 4B and FIG. 5B (front steering nozzle 40) and FIG. 8B and FIG. 9B (rear propulsion nozzle 60). In complete neutral, the vehicle 1 does not move.

In vehicle forward steered straight (VFSS), the front steering nozzle 40 has not changed from complete neutral and the left-right orientation of the rear propulsion nozzle 60 has not changed from complete neutral, but the rear propulsion nozzle 60 points rearward (FIG. 12B). In vehicle forward steered straight (VFSS), the vehicle 1 moves straight in a forward direction.

In vehicle forward steered left (VFSL), the front steering nozzle 40 points toward the right (FIG. 4A, FIG. 5A) and the rear propulsion nozzle 60 points toward the left (FIG. 8A, FIG. 9A). The rear propulsion nozzle 60 points rearward. In vehicle forward steered left (VFSL), the vehicle 1 moves in a forward direction while turning left.

In vehicle forward steered right (VFSR), the front steering nozzle 40 points toward the left (FIG. 4C, FIG. 5C) and the rear propulsion nozzle 60 points toward the right (FIG. 8C, FIG. 9C). The rear propulsion nozzle 60 points rearward. In vehicle forward steered right (VFSR), the vehicle 1 moves in a forward direction while turning right.

In vehicle reverse steered straight (VRSS), the front steering nozzle 40 has not changed from complete neutral and the left-right orientation of the rear propulsion nozzle 60 has not changed from complete neutral, but the rear propulsion nozzle 60 points forward (FIG. 12A). In vehicle reverse steered straight (VRSS), the vehicle 1 moves straight in a backward direction.

In vehicle reverse steered left (VRSL), the front steering nozzle 40 points toward the left (FIG. 4C, FIG. 5C) and the rear propulsion nozzle 60 points toward the right (FIG. 8C, FIG. 9C). The rear propulsion nozzle 60 points forward (FIG. 12A). In vehicle reverse steered left (VRSL), the vehicle 1 moves in a backward direction while turning left (as viewed when looking forward).

In vehicle reverse steered right (VRSR), the front steering nozzle 40 points toward the right (FIG. 4A, FIG. 5A) and the rear propulsion nozzle 60 points toward the left (FIG. 8A, FIG. 9A). The rear propulsion nozzle 60 points forward (FIG. 12A). In vehicle reverse steered right (VRSR), the vehicle 1 moves in a backward direction while turning right (as viewed when looking forward).

In side shift left (SSL), the front steering nozzle 40 points toward the right (FIG. 4A, FIG. 5A) and the rear propulsion nozzle 60 points toward the right (FIG. 8C, FIG. 9C). The forward-rearward orientation of the rear propulsion nozzle 60 has not changed from complete neutral. In side shift left (SSL), the vehicle 1 moves directly leftward.

In side shift right (SSR), the front steering nozzle 40 points toward the left (FIG. 4C, FIG. 5C) and the rear propulsion nozzle 60 points toward the left (FIG. 8A, FIG. 9A). The forward-rearward orientation of the rear propulsion nozzle 60 has not changed from complete neutral. In side shift left (SSL), the vehicle 1 moves directly rightward.

With particular reference to FIG. 11, the agitation nozzle 20 is also adjustable horizontally and vertically to able to direct liquid manure through an outlet 21 of the agitation nozzle 20 in various directions. The agitation nozzle 20 is adjustable vertically by operation of an articulated linkage mechanism 23, which is operated by an actuator (not shown) pivotally connecting the articulated linkage mechanism 23 to one of the conduits 6, 6b of the vehicle 1. The conduit 6b is rotatably mounted to one of the conduits 6 at a mounting plate 26, which can be rotated using an actuator (not shown) to swivel the conduit 6b about a vertically oriented rotation axis in order to move the agitation nozzle 20 in an arc left and right at a front of the vehicle 1.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. An amphibious vehicle for operation in a liquid manure lagoon, the amphibious vehicle comprising:
   a floatable vehicle body;
   a power source mounted on the vehicle body;
   ground-engaging wheels mounted on the vehicle body and operatively connected to the power source;
   a first liquid manure mover;
   a first adjustment assembly for vertically positioning the first liquid manure mover with respect to a surface of the lagoon, the first adjustment assembly comprising:
      a pivoting linkage assembly connecting the first liquid manure mover to the vehicle, the pivoting linkage assembly comprising a plurality of linkage arms pivotally connected in a closed-loop series, the first liquid manure mover mounted on a vertically oriented arm of the plurality of linkage arms; and,
      a linkage actuator pivotally connected at a proximal end thereof to the vehicle body and pivotally connected at a distal end thereof to a horizontally oriented arm of the plurality of linkage arms, actuation of the linkage actuator causing the horizontally oriented arm to pivot in the pivoting linkage assembly thereby causing the vertically oriented arm to translate vertically with the first liquid manure mover mounted thereon;
   a second liquid manure mover; and,
   a second adjustment assembly for angularly orienting the second liquid manure mover with respect to the surface of the lagoon, the second adjustment assembly comprising:
      a mounting plate having an eccentrically positioned lobe, the second liquid manure mover mounted on the mounting plate; and,
      a mounting plate actuator pivotally connected to the vehicle body and pivotally connected to the eccentrically positioned lobe at a point spatially offset from an axis of rotation of the mounting plate, actuation of the mounting plate actuator causing the mounting plate to rotate thereby causing the second liquid manure mover to rotate to angularly adjust the orientation of the second liquid manure mover.

2. The vehicle of claim 1, wherein the vertically adjustable liquid manure mover comprises a propeller.

3. The vehicle of claim 1, wherein the linkage assembly is a 4-bar linkage assembly.

4. The vehicle of claim 1, wherein the mounting plate actuator comprises a double-barreled actuator comprising a first extendible rod and a second extendible rod, an end of the first extendible rod pivotally connected to the vehicle body and an end of the second extendible rod pivotally connected to the eccentrically positioned lobe, the first and second extendible rods extending in opposite directions along extension axes that are non-parallel with a longitudinal axis of the vehicle.

5. The vehicle of claim 1, wherein the vehicle further comprises a fluid pump and the angularly adjustable liquid manure mover comprises a fluid conduit through which liquid manure is pumped by the fluid pump.

6. The vehicle of claim 5, wherein the fluid conduit comprises a nozzle.

7. The vehicle of claim 1, wherein at least one of the liquid manure movers is operable to provide propulsion, steering, or propulsion and steering for the vehicle while the vehicle is floating in a liquid manure lagoon.

8. The vehicle of claim 1, wherein the power source is configured to provide power to the ground-engaging wheels, the liquid manure movers and the adjustability of the liquid manure movers.

9. An adjustable component for use on an amphibious vehicle in a liquid manure lagoon, the adjustable component comprising:
   a liquid manure mover; and,
   an adjustment assembly mountable on the vehicle for vertically positioning the liquid manure mover with respect to a surface of the lagoon, the adjustment assembly comprising:
      a pivoting linkage assembly configured to be connected to the vehicle for connecting the liquid manure mover to the vehicle, the pivoting linkage assembly comprising a plurality of linkage arms pivotally connected in a closed-loop series when mounted on the vehicle, the first liquid manure mover mounted on a vertically oriented arm of the plurality of linkage arms; and,
      a linkage actuator pivotally connectable at a proximal end thereof to the vehicle body and pivotally connected at a distal end thereof to a horizontally oriented arm of the plurality of linkage arms, actuation of the linkage actuator causing the horizontally oriented arm to pivot in the pivoting linkage assembly thereby causing the vertically oriented arm to translate vertically with the first liquid manure mover mounted thereon.

10. The adjustable component of claim 9, wherein the liquid manure mover comprises a propeller.

11. An adjustable component for use on an amphibious vehicle in a liquid manure lagoon, the adjustable component comprising:
   a liquid manure mover; and,
   an adjustment assembly mountable on the vehicle for angularly orienting the liquid manure mover with respect to a surface of the lagoon, the adjustment assembly comprising:
      a mounting plate having an eccentrically positioned lobe, the liquid manure mover mounted on the mounting plate, the mounting plate configured to be rotatably mounted on the vehicle; and, a mounting plate actuator pivotally connectable to the vehicle body and pivotally connected to the eccentrically positioned lobe at a point spatially offset from an axis of rotation of the mounting plate, actuation of the mounting plate actuator causing the mounting plate to rotate thereby causing the liquid manure mover to rotate to angularly adjust the orientation of the liquid manure mover.

12. The adjustable component of claim 11, wherein the liquid manure mover comprises a fluid conduit.

13. The adjustable component of claim 12, wherein the fluid conduit comprises a nozzle.

14. An amphibious vehicle for operation in a liquid manure lagoon, the amphibious vehicle comprising:

a floatable vehicle body;

a power source mounted on the vehicle body;

ground-engaging wheels mounted on the vehicle body and operatively connected to the power source;

an angularly adjustable liquid manure mover for providing propulsion and steering for the vehicle;

a double-barreled actuator connecting the liquid manure mover to the vehicle whereby actuation of the double-barreled actuator angularly adjusts the liquid manure mover to move and steer the vehicle; and, a controller operatively connected to the double-barreled actuator, the controller configured to automatically return the liquid manure mover to a state in which the vehicle is not propelled and steered when an operator is not actively operating the vehicle.

15. The vehicle of claim 14, wherein the angularly adjustable liquid manure mover is a first angularly adjustable liquid manure mover, the double-barreled actuator is a first double-barreled actuator, and wherein the vehicle further comprises:

an angularly adjustable second liquid manure mover for providing steering for the vehicle; and, a second double-barreled actuator connecting the second liquid manure mover to the vehicle whereby actuation of the second double-barreled actuator angularly adjusts the second liquid manure mover.

16. The vehicle of claim 15, wherein the controller simultaneously controls both the first and second double-barreled actuators and returns both the first and second liquid manure movers to a state in which the vehicle is not propelled and steered when an operator is not actively operating the vehicle.

* * * * *